Patented Oct. 15, 1946

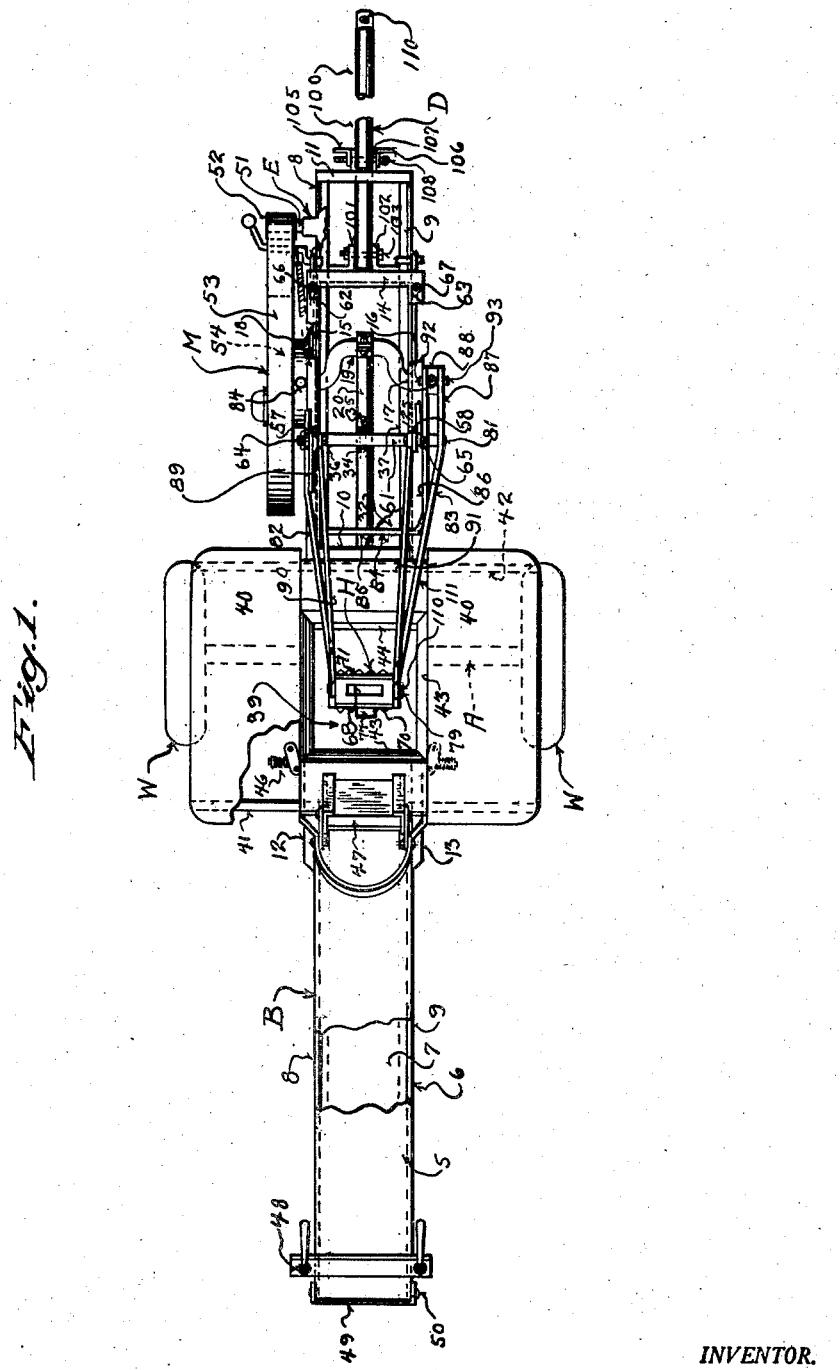

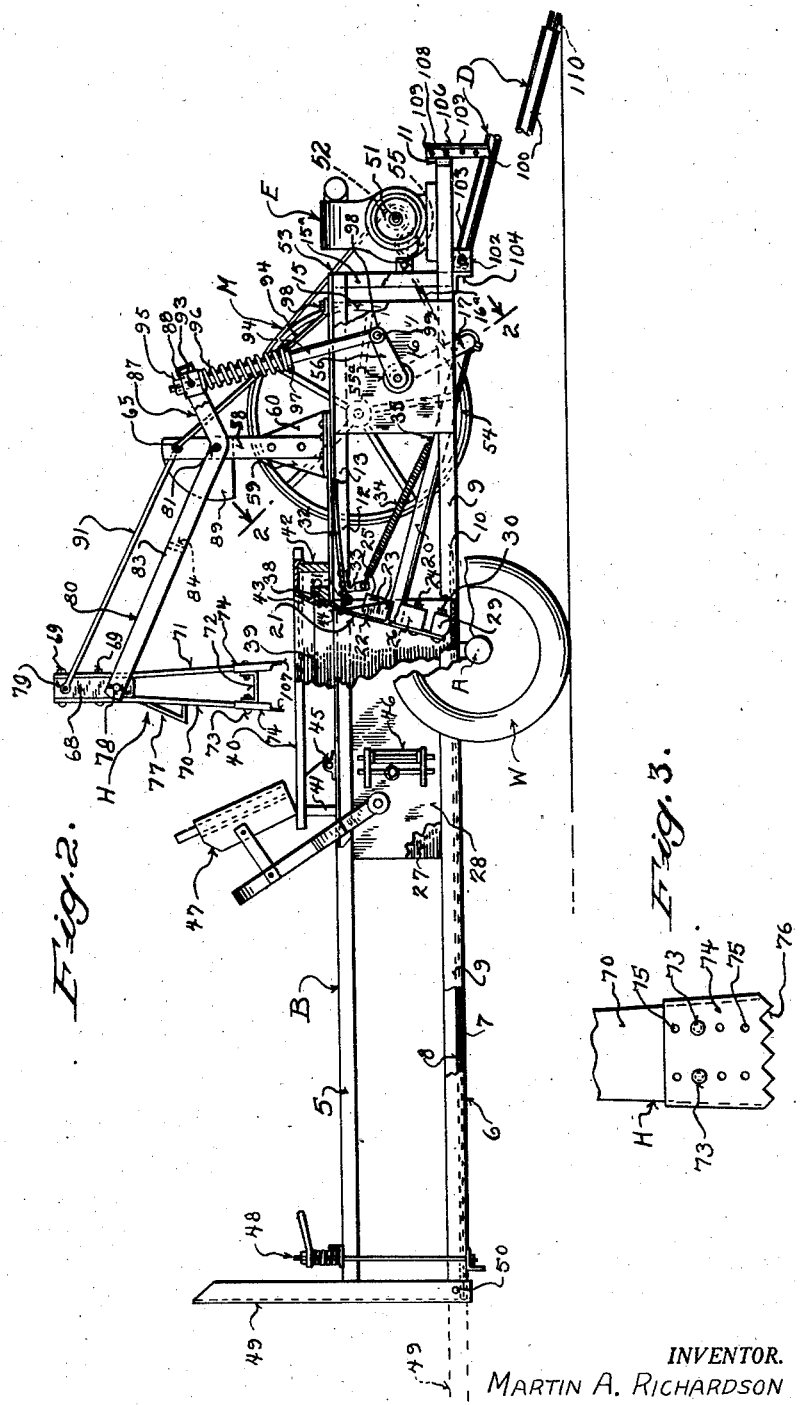

2,409,313

UNITED STATES PATENT OFFICE 2,409,313

VEHICLE DRAW BAR

Martin A. Richardson, Racine, Wis., assignor to J. I. Case Company, Racine, Wis., a corporation Application October 2, 1940, Serial No. 359,310

2 Claims. (Cl. 280—33.4)

The present invention relates to balers and an object thereof is to generally improve the construction and operation of devices of this class. Further objects are to provide an improved feeder head construction for a baler; such mechanism actuated directly from the main crank and safety means for preventing damage in the event that the feeder head is inadvertently blocked. A particular object of the invention is to provide improved chassis construction in a baler to facilitate transportation and including an improved tongue or draw bar for attaching the baler to a propelling vehicle and adapted to support the baler for operation. Further objects and advantages will become apparent from the following description and accompanying drawings in which:

Figure 1 is a plan view with parts broken away of a baler embodying the invention.

Fig. 2 is a right side elevation of the machine with parts broken away to show interior features.

Fig. 3 is a detail of certain mechanism shown in Fig. 2.

Similar reference characters have been applied to the same parts throughout the specification and drawings.

As seen in Fig. 2, the machine comprises generally a baling chamber B mounted on an axle A and supported on wheels or other suitable ground engaging elements W, the chamber extending beyond the axle to form the main body portion of the machine and a support for the actuating mechanism generally designated as M. A draw bar D is pivoted to the extension of bale chamber B and by which the machine may be connected to a propelling vehicle and readily trailed therefrom for transportation. An engine E of any suitable or well-known type may be mounted in the region of draw bar D and connected for actuating mechanism M. A feeder head H is also provided for assisting in introducing material into the chamber B in the usual manner.

Returning to a more detailed description of the machine, baling chamber B, as more particularly shown in Fig. 1, comprises an upper channel section member 5 and a lower channel member generally designated as 6, the latter comprising a plate 7 having angle section members 8 and 9 fixed therewith to form the flanges.

Plate 7 extends approximately to a point 10 and members 8 and 9 extend through to a cross member 11 forming the forward extremity of the machine proper and defining a shelf or extension for engine E. Angle elements 12 and 13 are fixed with channel member 5 and extend forwardly to a cross member 14 rearwardly of said shelf, members 8, 9, 12 and 13 defining a box-like framework constituting the extension of bale chamber B on which mechanism M is mounted. A plate 15 extends substantially vertically between members 8 and 12 (Fig. 2) and a plate 16 also extends substantially vertically between members 9 and 13, uprights 15a and 16a being spaced from plates 15 and 16 and extended between members 12 and 8, and 13 and 9, respectively.

Plates 15 and 16 as will be apparent from Fig. 1 constitute supporting means for the main or crank shaft 17 and for a gear case generally designated as 18. Crank shaft 17 has a journal portion 19, with which is engaged a pitman 20 in the present instance fixed with a plunger head generally designated as 21, Fig. 2. Plunger head 21 comprises a plate 22 fastened transversely of pitman 20 in any suitable manner as by welding, and it may be braced as by brackets or the like such as 23, interposed between the pitman 20 and the plate 22. Plate 22 has fixed therewith as by bolts 24—24 slide blocks or guides 25 and 26 which contact the side portions or plates 27 and 28 of bale chamber B and guide the plunger for reciprocating movement. Any suitable type of slide bearing may be used at this point, although in the present instance hard wood impregnated with oil has proved satisfactory. A third slide block 29 is fixed across the lower edge of plate 22 and slides on plate 7 constituting the major portion of above mentioned channel member 6, being the bottom of the baling chamber. Block 29 may be held in place on plate 22 by bolts such as 30.

Plunger 21 accordingly performs a combination reciprocating and oscillating movement which is satisfactory for baling purposes and the construction avoids the complication of the hinge or wrist pin commonly provided between pitman 20 and head 21.

Plate 22 has connected therewith as by a hinge 31, a plate 32 of a width substantially that of the baling chamber and having a downwardly extended arm 33 connected by a spring or the like 34 with an anchorage 35 on pitman 20. The tension of spring 34 acts through lever arm 33 to cause a continuous upward urging of plate 32. Plate 32 is accordingly pressed against the underside of suitable rails or strips 36 and 37, Fig. 1, projecting inwardly from above mentioned angle members 12 and 13 respectively. Strips 36 and 37 terminate at a cross-member 38, Fig. 2, above the bale chamber and defining the outward margin of a feed opening generally designated as 39, in a platform 40.

Platform 40 is supported on cross-members 41 and 42 from bale chamber B and has downwardly and inwardly inclined walls or guiding portions 43 defining the other margins of opening 39.

Plate 32 reciprocates with plunger 21 and serves to close opening 39 behind the plunger to prevent material being baled from finding its way to the back side of the plunger. The plate is continuously urged against the lower sides of strips 36 and 37 by spring 34 and accordingly performs its functions regardless of the oscillating movement of plunger 21. A flap 44 of fabric or other suitable flexible material may be carried by cross-member 38 to close the necessary clearance space between the plunger 22 and cross-member 38.

A tucker generally designated as 45 of any suitable or well-known type is provided at the outer end of opening 39 and forms no part of the present invention.

Any suitable retaining dog structure generally designated as 46 may also be provided and mounted on plates 27 and 28. These dog constructions forming no part of the present invention are not further described.

Likewise, block dropping means generally designated as 47 of any well-known type is contemplated. At the outer end of bale chamber B, compressing means as 48 of any suitable or well-known type may be provided and a bale receiving chute or member 49 may be hinged at 50 or otherwise suitably supported from channel member 6 to be disposed in an inclined or substantially horizontal position when in use.

Turning now to the actuating means for pitman 20, above mentioned engine E has a crank or other driving shaft 51, Fig. 1, carrying a pulley 52 driving as by means of a belt 53, a large pulley or fly wheel generally designated as 54. Belt 53 may be caused to wrap pulley 52 by means of an idler 55, pressing upwardly for example against the lower run of belt 53 as particularly seen in Fig. 2.

Crank shaft 17 at its end remote from housing 18 is journaled in a bearing 55ª, Fig. 2, carried by above mentioned plate 16. Bearing 55ª may be of any suitable type. Shaft 17 extends outwardly a short distance beyond bearing 55ª and has fixed therewith a crank 56 for actuating above mentioned feeder head H.

Feeder head H, as more particularly shown in Figs. 1 and 2, is carried on a standard or frame comprising uprights 57 and 58 fixed in any suitable manner respectively with strips 36 and 37 and angle members 12 and 13 and braced as by angle plates 59 and 60. Uprights 57 and 58 are connected with each other as by a tubular element 61, and brace rods or the like 62 and 63 are fixed with the upper extremities of uprights 57 and 58 as by stud bolts 64 and 65 of suitable or well-known type. Brace rods 62 and 63 extend forwardly and downwardly to members 12 and 13 respectively, where they are anchored as by bolts 66 and 67. In this manner a relatively rigid standard is provided for carrying the feeder head.

Feeder head H is moved in a sweeping up and down movement so as to enter opening 39 by means of a suitable parallel motion to be presently described. The head itself comprises a block or the like 68, Fig. 2, to which are fastened, as by bolts 69—69, feeder boards 70 and 71, extending downwardly and spaced apart as by a spreader 72. Spreader 72 is held in position as by bolts 73 which also pass through feeder board plates 74—74. Plates 74 are provided with a plurality of holes 75—75 as seen more particularly in Fig. 3 so that they may be adjusted in their relation to the feeder boards 70 and 71. Plates 74 are also provided with teeth 76 for more securely engaging hay or other material to be baled.

Board 70 has an abutment or "nose" 77 of suitable or well-known construction for inserting a dividing block in the bale chamber in familiar manner forming no part of the present invention.

Block 68 has a pin 78 therein through which it is supported by the above mentioned parallel mechanism. Another pin or bolt 79 spaced from pin 78 is engaged by the parallel mechanism for guiding the motion of the head.

The above mentioned parallel motion includes an A frame generally designated as 80 which, as more particularly shown in Fig. 1, includes a pin or shaft 81 passing through and journaled in above mentioned tubular portion 61 and fixed in any suitable manner with a side element 82 and also with a side element 83, side elements 82 and 83 defining the outer margins of the frame. Elements 82 and 83 are pivotally secured at their upper ends to block 68 by pin 78. A brace element 84 has a portion 85 substantially parallel to pin 81 and extending across between above mentioned elements 82 and 83 and suitably fixed therewith at its points of contact as for example by welding, although it is to be understood that other means is contemplated for securing the parts together. Another portion 86 extends transversely to shaft 81 and spaced somewhat from portion 85 to form a strong actuating arm generally designated as 87. Portion 87 is curved upwardly at about the point where it engages shaft 81 as particularly shown in Fig. 2 and a block 88 is engaged between portion 86 and member 83 for connecting with an actuating pitman to be described presently. The oscillating of A frame 80 will accordingly cause up and down movement of head H.

Portion 82 and upright 57 move together in the manner of a shear, and in order to avoid danger of injury to persons or objects inadvertently inserted between them, a plate 89 is fixed with upright 57 between it and portion 82 so that insertion of the fingers, or small objects between the moving parts is impossible.

To guide the movement and insure its taking place in the proper path, braces 90 and 91 extend respectively from bolts 64 and 65 to pin or bolt 79. These braces may be substantially parallel or otherwise related to the frame 80 to maintain the desired motion, as seen more particularly in Fig. 3.

Block 88 has trunnions 92 and 93 journaled respectively in portion 86 and element 83, thereby supporting the block between the two sections of arm 87. A connecting rod or pitman 94 passes through block 88 and carries a nut or other abutment 95 engaged therewith normally by the pressure of a spring 96 acting upwardly against block 88 and downwardly against an abutment 97, suitably fixed with rod 94. Rod 94 has a bearing portion 98 journaled on a pin 99 fixed with above mentioned crank 56. Rotation of crank 56 will accordingly actuate rod 94, arm 87, A frame 80 and accordingly head H. The force of spring 96 is so chosen as to normally maintain nut 95 and block 88 in firm engagement, but in the event that movement of head H is blocked for any reason, rod 94 may slide through block 88 with a corresponding compression of spring 96 which will relieve the parts from excessive stress and usually prevent damage. A slight adjustment of the range of movement of head H may be obtained by adjusting nut 95, and the effect of the feeder head may also be varied by changing the position of plates 74—74.

Draw bar D, as particularly shown in Figs. 1 and 2 comprises in the present instance a tubular or other suitable element 100 engaged between brackets 101 and 102 as by a pin, bolt, or the like 103, brackets 102 and 101 being fixed for example on a cross member 104 or the like extending between above mentioned members 8 and 9. Member 100 may be spaced in various positions below members 8 and 9 to give a suitable adjustment of the front end of the baler relatively to a propelling vehicle or the like. A quadrant or the like, comprising in the present instance upwardly directed plates 105 and 106, extends on either side of a forwardly projecting channel or bracket 107 or the like through which may be extended a pin 108, member 107 being fixed for example with above mentioned cross member 11. Plates 105 and 106 are rigidly connected with element 100 and may be provided with a plurality of holes 109—109 which may be engaged by pin 108 extending also through suitable openings in bracket member 107 to position draw bar portion 100 in the desired attitude relatively to members 8 and 9. Other methods are contemplated for securing the draw bar in position. Thus it may be positioned to correspond with the height of the hitch on nearly any vehicle, and it is contemplated that it may be lowered to a position to engage the ground for supporting the baler for operation, even when no vehicle is present. Portion 100 may be provided with an eye 110 or any other suitable or well-known means for attaching it to a propelling vehicle.

The operation of the above disclosed machine is thought to be clear from the previous description and need not be further described, except to say that engine E drives through fly wheel 54 and the reduction gears in casing 18, the crank 17, actuating through pitman 20, plunger head 21. The necessity for a wrist pin is eliminated by fastening head 21 rigidly to pitman 20 and allowing the head to oscillate on block 29 as it slides. Crank 17 carries and actuates through an auxiliary crank 56, a connecting rod 94 and A frame 80, a feeder head H which acts to introduce material into the baling chamber through an opening 39. For setting up the machine for operation, draw bar D may be lowered to rest on the ground and for transportation draw bar D may be readily adjusted to various positions to suit the height of the propelling vehicle.

The above being a complete description of an illustrative embodiment of the invention what is claimed as new and desired to be secured by Letters Patent of the United States is:

1. In a vehicle, a frame including a cross member, an axle arranged in supporting relation to the frame, and to the rear of the center of gravity thereof, a movable draft and supporting element pivoted to said cross member, a second cross member on the frame and spaced from the pivotal connection of said supporting element with the first cross member, spaced plates extending generally upwardly from said element so as to move adjacent said second cross member when said element is pivoted about said first cross member, a bracket projecting from said second cross member between said spaced plates, said bracket providing an opening and said plates providing a series of pairs of openings alignable with the opening in said bracket by pivotal movement of said element, and a pin traversing the opening in said bracket and one of the pairs of openings in said plates for securing said element in a selected position.

2. In a vehicle, a frame, an axle arranged in supporting relation to the frame and to the rear of the center of gravity thereof, a movable draft and supporting element pivoted to the frame, a bracket extending from the frame at a point spaced from the pivotal connection, spaced plates fixedly connected with said element and extending generally upwardly therefrom in a position to include said bracket therebetween, said bracket providing an opening and said plates providing a series of pairs of openings alignable with the opening in said bracket by movement of said element about the pivotal connection, and a pin traversing the opening in said bracket and one of the pairs of openings in said plates for securing said element in a selected position.

MARTIN A. RICHARDSON.